United States Patent
Pierce, III

[11] Patent Number: 5,757,483
[45] Date of Patent: May 26, 1998

[54] DUAL BEAM OPTICAL SPECTROGRAPH

[75] Inventor: William B. Pierce, III, Oldsmar, Fla.

[73] Assignee: Stellarnet, Inc., Oldsmar, Fla.

[21] Appl. No.: 907,155

[22] Filed: Aug. 6, 1997

[51] Int. Cl.⁶ .................................................. G01J 3/18
[52] U.S. Cl. ...................................... 356/305; 356/328
[58] Field of Search .................................. 356/305, 319, 356/320, 326, 328, 334

[56] References Cited

U.S. PATENT DOCUMENTS

| | | |
|---|---|---|
| 2,453,164 | 11/1948 | Swings .................................. 356/305 |
| 3,868,485 | 2/1975 | Genzel et al. . |
| 4,060,327 | 11/1977 | Jacobowitz et al. . |
| 4,289,401 | 9/1981 | Mohr .................................... 356/305 |
| 4,468,121 | 8/1984 | Koizumi et al. ...................... 356/328 |
| 4,983,039 | 1/1991 | Haranda et al. ...................... 356/328 |
| 5,164,674 | 11/1992 | Delhaye et al. ...................... 356/328 |
| 5,305,082 | 4/1994 | Bret ..................................... 356/328 |
| 5,402,227 | 3/1995 | Schuma ............................... 356/328 |
| 5,497,230 | 3/1996 | Ohkubo et al. ...................... 356/328 |
| 5,532,818 | 7/1996 | Tokumoto ........................... 356/328 |
| 5,565,983 | 10/1996 | Barnard .............................. 356/328 |

*Primary Examiner*—F. L. Evans
*Attorney, Agent, or Firm*—Larson & Larson, P.A.; James E. Larson

[57] ABSTRACT

A dual beam optical spectrograph includes a housing defining an internal chamber that is divided into two subchambers with a partition. A liner array detector such as a charge coupled detector array (CCD) is located within the chamber symmetrically to either side of the partition. Two light inputs are provided to either side of the partition between the CCD and a planar diffraction grating, and each light input is led through a concave collimating mirror, a planar diffraction grating, and a concave focusing mirror before light impinges upon the CCD. The inventive spectrograph is capable of providing synoptic data since both optical channels are captured simultaneously. The housing can be mounted on an adapter for an IBM compatible printed circuit board.

18 Claims, 1 Drawing Sheet

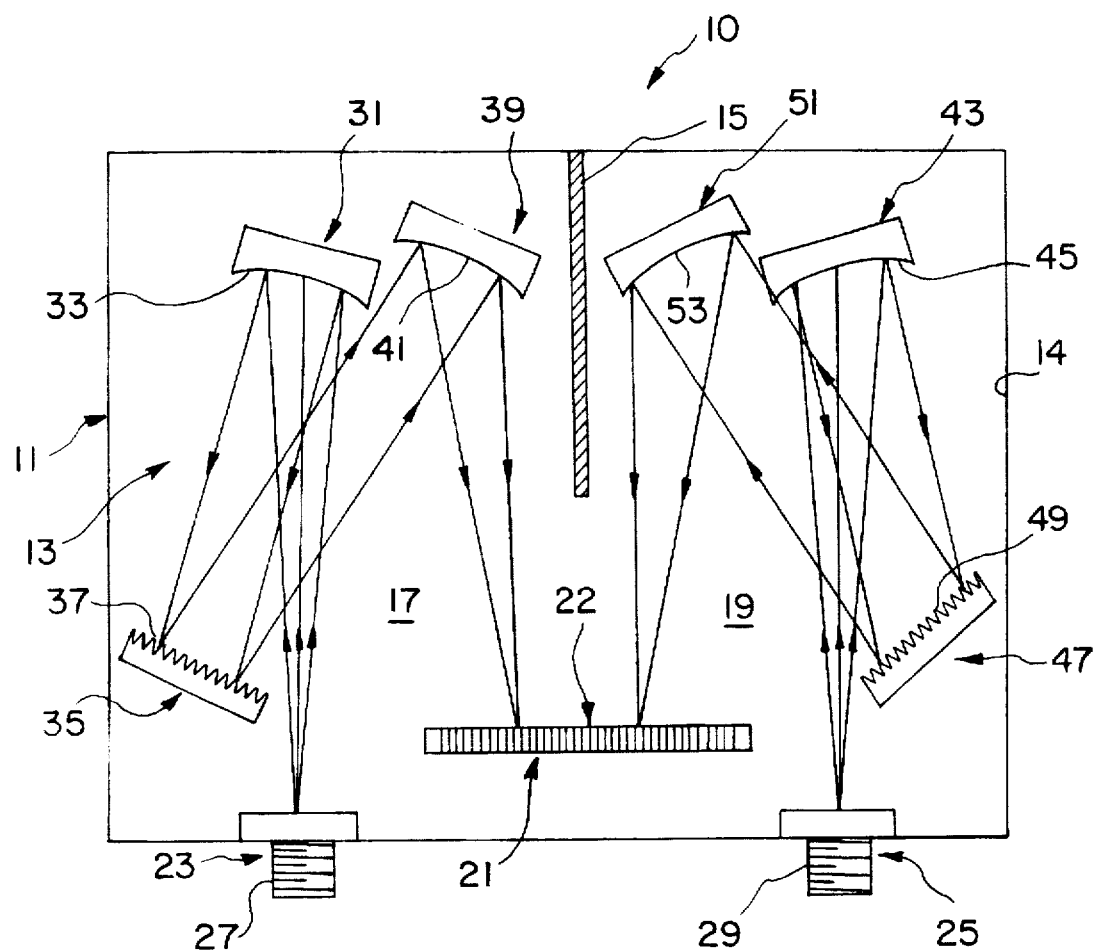
Figure

DUAL BEAM OPTICAL SPECTROGRAPH

BACKGROUND OF THE INVENTION

The present invention relates to a dual beam optical spectrograph. In the prior art, spectrographs are well known. However, Applicant is unaware of any spectrograph containing the configuration, features and aspects of the present invention. The following prior art is known to Applicant:

U.S. Pat. No. 3,868,185 to Genzel et al.
U.S. Pat. No. 4,060,327 to Jacobowitz et al.
U.S. Pat. No. 4,289,401 to Mohr
U.S. Pat. No. 4,983,039 to Harada et al.
U.S. Pat. No. 5,164,786 to Delhaye et al.
U.S. Pat. No. 5,305,082 to Bret
U.S. Pat. No. 5,402,227 to Schuma
U.S. Pat. No. 5,497,230 to Ohkubo et al.
U.S. Pat. No. 5,532,818 to Tokumoto
U.S Pat. No. 5,565,983 to Barnard.

None of these references taken alone or in combination with other references teaches or suggests the concept of dual light inputs within a partitioned chamber with each light input being conveyed through a concave collimating mirror, a planar diffraction grating, and a concave focusing mirror whereupon the light is impinged on a portion of a linear array detector.

Various configurations for spectrographs are well known such as the FASTIE-EBERT, and CZERNY-TURNER configuration. A well known single beam double-pass prism infrared spectrometer is the PERKIN-ELMER MODEL 112 where there is a double dispersion of the beam and a motor-driven rotation of a LITTROW mirror to cause the infrared spectrum to pass across an exit slit permitting measurement of the radiant intensity of successive frequencies. Although these prior art configurations have been useful they do not provide an architecturally small configuration for comparing dual beam inputs.

SUMMARY OF THE INVENTION

The present invention relates to a dual beam optical spectrograph that is architecturally compact and provides a means to compare the dual beams on a linear array detector such as a CCD. The present invention includes the following interrelated objects, aspects and features:

(1) In a first aspect, a housing is provided having outer walls defining an inner chamber divided, by a partition, into two subchambers. A CCD is mounted within the chamber in a position symmetrical to either side of the partition.

(2) Each subchamber includes an optical connector positioned between a planar diffraction grating and the CCD, allowing light to be inputted, for example, from an optical fiber into the subchamber enclosed within a compact housing capable of being mounted on a plug-in card on an IBM compatible printed circuit board.

(3) Light inputted via the optical connector of each subchamber is directed, first, to a concave collimating mirror and is reflected therefrom onto a planar diffraction grating from which the light reflects onto a concave focusing mirror that focuses the light on the half of the CCD located in the particular subchamber.

(4) Through the use of the system, it is possible to obtain synoptic data since both subchambers may receive light simultaneously. Thus, one can employ the present invention to measure two separate samples simultaneously or, alternatively, a sample as well as light from a reference light source.

Accordingly, it is a first object of the present invention to provide a dual beam optical spectrograph that can be mounted in a plug-in card for an IBM compatible printed circuit board.

It is a further object of the present invention to provide such a device including two separate subchambers, each of which includes an optical connector therein allowing connection to a source of light.

It is a still further object of the present invention to provide such a device including a CCD mounted within a chamber thereof symmetrical with respect to a chamber partition.

It is a still further object of the present invention to provide such a spectrograph wherein each subchamber thereof includes means for conveying light through a concave collimating mirror, a plane grating, a concave focusing mirror and thence onto a CCD.

These and other objects, aspects and features of the present invention will be better understood from the following detailed description of the preferred embodiment when read in conjunction with the appended drawing FIGURE.

BRIEF DESCRIPTION OF THE DRAWING

The sole FIGURE shows a top schematic representation of the present invention.

SPECIFIC DESCRIPTION OF THE PREFERRED EMBODIMENT

With reference to the sole FIGURE, the present invention is generally designated by the reference numeral 10 and is seen to include a housing 11 defining an internal chamber 13 including inner walls 14.

The chamber 13 includes an internal partition 15 that divides the chamber 13 into subchambers 17 and 19.

A linear array detector such as a charge coupled detector (CCD) 21 or a photodiode array is contained within the chamber 13 in such a manner that an imaginary extension of the partition 15 bisects the CCD 21. Put another way, the CCD is symmetrical about a line of extension of the partition 15 such that one-half of the active elements of the CCD are contained within the subchamber 17 and the other half of these active elements are contained within the subchamber 19. For example, the CCD may consist of an array of 2048 active elements.

The housing 11, preferably made of aluminum or a low coefficient of thermal expansion microcomposite material, includes two optical connectors 23 and 25 mounted through the walls 14 thereof, with the optical connector 23 allowing optical access to the subchamber 17 and with the optical connector 25 allowing optical access to the subchamber 19. The connector 23 includes a threaded post 27 designed to receive a coupling element (not shown) of an optical fiber. The post 29 has the same structure as that of the post 27. The posts 27 and 29 are each mounted between the CCD and a planar diffraction grating.

Within the subchamber 17, a concave collimating mirror 31 is provided including a concave collimating surface 33. The mirror 31 is so positioned within the subchamber 17 that light entering via the optical connector 23 will impinge on the reflecting surface 33 thereof. A planar grating 35 is provided within the subchamber 17 so that light reflected from the active surface 33 of the concave collimating mirror 31 next impinges on the planar diffraction grating 35 on its active surface 37 and is thereafter reflected toward a concave focusing mirror 39 having a concave reflective surface 41 thereon. The surface 41 reflects the light onto that portion of the active area 22 of the CCD that is contained within the subchamber 17. It is preferred that the grating have about 600–1800 lines/mm depending on the application range as hereafter set forth.

Similarly, with reference to the subchamber 19, contained therewithin are a concave collimating mirror 43 having an active surface 45 thereon, a planar diffraction grating 47 having the grating surface configuration 49, and a concave focusing mirror 51 having the mirror surface 53. Half of the active area 22 of the CCD 21 is contained within the subchamber 19.

The planar diffraction gratings 35 and 47 are relatively inexpensive and more versatile than concave holographic gratings. As desired, the inventive spectrograph 10 may be configured to operate in several wavelength ranges with the particular wavelength range chosen being controlled by the choice of the planar diffraction grating 35, 47 installed. For example, planar diffraction gratings 35, 47 may be chosen to operate within the ultraviolet range from 200–450 nm (nanometers), the visible color range from 350–850 nm, and the near infrared range from 500–1000 nm.

The present invention may be used to provide synoptic data since both optical channels may capture light simultaneously. Thus, one can employ the present invention to measure two separate samples simultaneously or to simultaneously measure a sample as well as reference light.

Synoptic data allows reference channel compensation to eliminate variance in flash illuminations or bulb degradation in continuous process monitoring. In other applications, the synoptic dual beam structure can be employed to observe different angles in short life or high speed reactions for process control.

In the preferred embodiment of the present invention, the CCD is only 1 inch long, total. The complete housing subtends all area of only 2.5×3.75 inches with the two optical connectors 23 and 25 being about 2 inches apart. This small size leads to lower cost and more innovative uses of the present invention as compared to the prior art for every day applications. As an example, the housing can be mounted on an adapter (plug-in card) for an IBM compatible circuit board.

As such, an invention has been disclosed in terms of a preferred embodiment thereof which fulfills each and every one of the objects of the invention and provides a new and useful dual beam optical spectrograph of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A spectrograph, comprising:
a) a housing with outer walls defining an inner chamber divided into two subchambers by a partition;
b) each subchamber having a light input;
c) each subchamber containing at least one concave collimating mirror adapted to direct light from said light input onto a planar diffraction grating from which the light is reflected to a concave focusing mirror and then onto a single contiguous light detector means; and
d) the light input in each subchamber is located between the planar grating and the light detector means.

2. The spectrograph of claim 1, wherein each light input comprises an optical fiber coupling.

3. The spectrograph of claim 1, wherein said light detector means comprises a single linear array light detector simultaneously serving both subchambers.

4. The spectrograph of claim 3, wherein said linear array light detector consists of a CCD array or a photodiode array.

5. The spectrograph of claim 1, wherein said planar diffraction grating operates within a range of 200–450 nm.

6. The spectrograph of claim 1, wherein said planar diffraction grating operates within a range of 350–850 nm.

7. The spectrograph of claim 1, wherein said planar diffraction grating operates within a range of 500–1000 nm.

8. A spectrograph, comprising:
a) a housing with outer walls defining an inner chamber divided into two subchambers by a partition;
b) each subchamber having a light input;
c) each subchamber containing a concave collimating mirror followed by a planar diffraction grating followed by a concave focusing mirror adapted to reflect light from said light input onto a single linear array light detector symmetrically disposed in said chamber with respect to said partition; and
d) the light input in each subchamber located between the planar diffraction grating and the linear array light detector.

9. The spectrograph of claim 8, wherein each light input comprises an optical fiber coupling.

10. The spectrograph of claim 8, wherein said planar diffraction grating operates within a range of 200–450 nm.

11. The spectrograph of claim 8, wherein said planar diffraction grating operates within a range of 350–850 nm.

12. The spectrograph of claim 8, wherein said planar diffraction grating operates within a range of 500–1000 nm.

13. The spectrograph of claim 8, wherein said housing is made from aluminum.

14. The spectrograph of claim 8, wherein said planar diffraction grating has about 600–1800 lines/mm.

15. The spectrograph of claim 8, wherein the linear array light detector is a CCD array.

16. The spectrograph of claim 8, wherein the linear array light detector is a photodiode array.

17. The spectrograph of claim 8, wherein the housing is made from a low coefficient of thermal expansion microcomposite material.

18. The spectrograph of claim 8, wherein the housing is mounted on a plug-in card for an IBM compatible printed circuit board.

* * * * *